United States Patent Office 3,655,664
Patented Apr. 11, 1972

3,655,664
2-ARYL-4(3H)-QUINAZOLINONES
Richard Pater, Wilmington, Del., assignor to E. I. du Pont de Nemours and Company, Wilmington, Del.
No Drawing. Filed Dec. 12, 1968, Ser. No. 783,401
Int. Cl. C07d 51/48
U.S. Cl. 260—251 QA                                  8 Claims

ABSTRACT OF THE DISCLOSURE

Process for preparing 2-phenyl-4(3H)-quinazolinone and derivatives thereof by heating a benzamide with an isatoic anhydride, which quinazolinones are useful as fluorescent agents, ultraviolet screens and the like.

---

This invention relates to a novel process for preparing 2-phenyl-4(3H)-quinazolinones and derivatives thereof, useful as fluorescent agents, ultraviolet screens and intermediates to quinazolines, also useful for, among other purposes, screening UV light.

Various 2-aryl-4(3H)-quinazolinone syntheses are described by Rodgers and Miliones in U.S. Pat. No. 3,169,129, but none have been found to be entirely satisfactory.

In addition, the well-known Niementowski reaction, which involves reaction of anthranilic acid or substituted anthranilic acid with amides, is not applicable to benzamides unless the imidoesters of thiobenzamides are employed, as illustrated by Endicott et al., J. Am. Chem. Soc. 68, 1229 (1946).

Meyer and Wagner, J. Org. Chem. 8, 239 (1943), discussing the use of isatoic anhydride in place of anthranilic acid or other derivative in the Niementowski reaction for forming quinazolinones, disclose that reaction with amides is excluded because their interaction yields unidentified amorphous products.

It is therefore an object of this invention to provide a novel process for preparing 2-phenyl-4(3H)-quinazolinones from readily available intermediates, particularly benzamides and preferably from o-hydroxy substituted benzamides.

BRIEF SUMMARY OF THE INVENTION

The present invention includes the process of heating a benzamide with an isatoic anhydride at a temperature of about 70–240° C. for a time sufficient to eliminate carbon dioxide and water from the reaction mass, and recovering the resultant 2-phenyl-4(3H)-quinazolinone from the reaction mass.

Inert organic solvents may optionally be employed in the above processes.

DETAILED DESCRIPTION OF INVENTION

It has now been found that 2-phenyl-4(3H)-quinazolinones may be simply and efficiently formed by the novel process of reacting a benzamide with an isatoic anhydride. The isatoic anhydride and the benzamide may be unsubstituted or nuclearly substituted provided that the substituents do not interfere with the desired reaction. Non-interfering groups include alkyl, alkoxyl, hydroxy, dialkylamino, halo and nitro. More particularly, the process can be represented by the equation

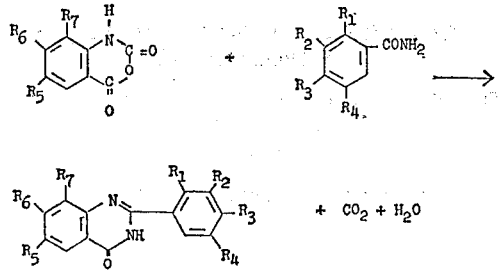

where $R_{1-4}$ stand for hydrogen, alkyl, alkoxy, hydroxy, dialkylamino, halo or nitro groups; and $R_5$ to $R_7$ stand for hydrogen, alkyl, alkoxy, halo or nitro groups. The alkyl and the alkyl moieties of the alkoxy and dialkylamino groups may contain up to eighteen carbons but normally will be $C_1$ to $C_5$ alkyl, such as methyl, ethyl, propyl, isopropyl, butyl, isobutyl, tertiary butyl and amyl for reasons of availability and economy. The halos include fluoro, chloro, bromo and iodo, preferably chloro and bromo.

With reference to the above equation, it is considered that quinazolinone formation occurs stepwise, to form first an N-(o-aminobenzoyl) benzamide (with elimination of $CO_2$), which then ring-closes, with elimination of water, to the quinazolinone. Both steps appear to proceed substantially simultaneously at elevated temperatures so that the desired quinazolinones can be obtained directly in what appears to be a simple one-stage reaction.

As the above equation indicates, quinazolinone formation requires equimolar amounts of isatoic anhydride and benzamide. Either reactant, however, may be in excess, e.g. up to a molar excess, if desired, although it is usually more advantageous when the reactants are premixed to have the isatoic anhydride in excess.

The reaction temperature normally ranges from about 70 to 240° C., preferably from about 100 to 200° C., depending on the particular reactants and their melting temperatures in admixture, on the ease with which the particular isatoic anhydride-benzamide combination reacts to form carbon dioxide and water, and on whether a solvent is present, since in general solvent tends to lower the temperature at which the mixture becomes molten, for intimate reactant contact, and to facilitate $CO_2$ and $H_2O$ elimination. The time of reaction likewise varies with reactants and temperature, but normally ranges from 0.5 to 6 hours.

Suitable diluents are liquid organic solvents and dissolve one or both reactants at the operating temperatures, are inert to the reactants and the reaction products, and have boiling points of at least about 100° C., preferably of at least 140° C. Representative solvents for the reaction are the xylenes, p-cymene, 1-methylnaphthalene, dimethyl sulfone, tetramethylene sulfone, N,N-dimethylformamide, N,N-dimethyl acetamide, dioxane and nitrobenzene.

The reactants may be mixed all at once before heating the mixture to reaction temperatures, or one may be added to the other incrementally or continuously at reaction temperatures. In the latter embodiment, the isatoic anhydride is preferably added to the benzamide. Preferably too since isatoic anhydrides tend to decompose somewhat at elevated temperatures, such component is added to the reaction mass at a rate just sufficient to consume it according to the above reaction scheme.

The quinazolines, normally solids, are generally higher melting than the isatoic anhydride-benzamide admixtures from which they are derived so that quite often the reaction mass, though at first molten at the reaction emperature, solidifies during the course of the reaction.

The quinazoline may be recovered from the reaction mass and purified, if necessary, by conventional means including solvent extraction, crystallization from solvents, and (taking advantage of the fact that the quinazolinones are normally soluble in aqueous caustic) dissolution in caustic followed by reprecipitation with acid.

Typical isatoic anhydrides that may be used in this invention include isatoic anhydride and the following nuclearly substituted derivatives thereof designated below by the substituents and their positions on the isatoic anhydride nucleus: 5-methyl-; 3-methyl-; 4-ethyl-; 5-tert.butyl-; 5-amyl-; 4,5-dimethyl-; 4,5-di-n-propyl-; 5-methoxy-; 3-methoxy-. 5-butoxy-; 5-amyloxy-; 3,5-dimethoxy-; 5-fluoro-; 5-chloro-; 5-bromo-; 4,5-dichloro-; 3,5-dichloro-; and 5-nitro-isatoic anhydride. Isatoic anhydride, 5-chloro-isatoic anhydride and 5-nitro-isatoic anhydride constitute a preferred class for reasons of availability.

Representative benzamides include benzamide and the following nuclearly substituted derivatives thereof: 2-methyl-; 3-methyl-; 4-methyl-; 4-ethyl-; 4-tert.butyl-; 4-amyl-; 3,4-dimethyl-; 2-methoxy-; 4-amyloxy-; 3,4-dimethoxy-; 3-chloro-; 4-chloro-; 3,5-dibromo-; 2-hydroxy-; 2,4-dihydroxy-; 2-hydroxy-4-ethoxy-; 2-hydroxy-5-chloro-; 2-hydroxy-3,5-dichloro-; 2-hydroxy-5-methyl-; 4-dimethylamino-; 4-diethylamino-; 4-dibutylamino-; 2-nitro-; 3-nitro-; 4-nitro-; and 2-nitro-4-chloro-benzamide. Benzamides noted above bearing a 2-hydroxy group constitute a preferred class.

Representative 2-phenyl-4(3H)-quinazolinones prepared according to this invention are described in the accompanying examples. Others that may be prepared include:

6-methoxy-2-phenyl-;
6-methoxy-2-(2-hydroxyphenyl)-;
6-butyl-2-(4-methoxyphenyl)-;
8-methoxy-2-(2-hydroxyphenyl)-;
6-chloro-2-phenyl-;
8-chloro-2-phenyl-;
6-ethyl-2-(2-hydroxyphenyl)-;
2-(2,4-dihydroxyphenyl)-;
2-(2-hydroxy-4-ethoxyphenyl)-;
2-(2-hydroxy-3,5-dichlorophenyl)-; and
2-(2-hydroxy-5-methylphenyl)-4(3H)-quinazolinone.

The isatoic anhydrides and benzamides to be utilized for the preparation of the above named quinazolinones are readily identified from the indicated structures by inspection.

EXAMPLES

The following examples further illustrate the invention. Unless otherwise noted, quantities are in parts by weight and temperatures are in degree centigrade. The empirical formula of each quinazolinone described below was confirmed by elemental analyses.

EXAMPLE 1

Preparation of 2-phenyl-4(3H)-quinazolinone (A) 1.5 parts of benzamide and 1.49 parts of isatoic anhydride were mixed and heated at 200° C. for 3 hours. The product, crystallized from benzene, melted at 235–6°.

(B) A mixture of 6.05 parts of benzamide, 7.45 parts of isatoic anhydride and 25 parts of dimethylformamide was heated at 150° for 4 hours. To the still warm reaction mixture was added water (20 parts) and the product was allowed to crystallize on cooling. Recrystallized from benzene it melted at 235–6°.

EXAMPLE 2

Preparation of 2-(m-nitrophenyl)-4(3H)-quinazolinone (A) m-Nitrobenzamide (1.66 parts) and isatoic anhydride (1.49 parts) were heated together at 180° to initiate carbon dioxide evolution. The mixture was then heated slowly up to 205° for 3 hours. The product, crystallized from acetic acid, melted at 352–3°.

(B) 4.98 parts of m-nitrobenzamide, 4.5 parts of isatoic anhydride and 12 parts of nitrobenzene were heated at 170° to give a clear solution. First carbon dioxide started to evolve, then after 1½ hours at 170° a precipitate appeared. The mixture was held at 170° for 2½ hours more, cooled and filtered. The collected solid was extracted with benzene and crystallized from acetic acid, M.P. 352–3°.

EXAMPLE 3

Preparation of 2-(p-nitrophenyl)-4(3H)-quinazolinone

A mixture of 1.66 parts of p-nitrobenzamide and 1.49 parts of isatoic anhydride was heated to 185° to bring about melting and carbon dioxide evolution. The mixture was then heated at 205° for 3 hours to complete the gas evolution and precipitation of solid product. The solid was dissolved in 80° C., 5% aq. solution of sodium hydroxide, reprecipitated by addition of dilute hydrochloric acid, filtered off, washed with water, dried and crystallized from acetic acid to give the product, M.P. 362–3°.

EXAMPLE 4

Preparation of 2-(p-chlorophenyl)-4(3H)-quinazolinone

Heating 1.56 parts of p-chlorobenzamide with 1.49 parts of isatoic anhydride at 190° until the mixture solidified completely (3 hours) and working up the reaction mixture as described in Example 3 gave the desired product, M.P. 303–4°.

EXAMPLE 5

Preparation of 2-(p-methylphenyl)-4(3H)-quinazolinone

This product was obtained by heating 1.35 parts of p-methylbenzamide with 1.49 parts of isatoic anhydride at 190° for 3 hours. On crystallization from acetone, the product melted at 239–240°, in agreement with the literature value (Tetrahedron, 1, 38 (1957)).

EXAMPLE 6

Preparation of 2-(o-hydroxyphenyl)-4(3H)-quinazolinone (A) Isatoic anhydride (163 parts, 1 mole) and salicylamide (137 parts, 1 mole) were heated in an open vessel at 140° with occasional stirring until carbon dioxide evolution and precipitation of solid product was complete (3 hours). The solid was crushed and extracted with boiling ethanol (1000 parts) to give 154 parts (65% yield) of the title compound, M.P. 297–8°. Recrystallized from acetic acid the product melted at 298°.

(B) A mixture of isatoic anhydride (8.2 parts) and of salicylamide (6.9 parts) in dimethylformamide (22 parts) was heated at 120° for 4 hours. The product was allowed to crystallize from the cooled solution. It was filtered, washed with a small amount of dimethylformamide, extracted with boiling ethanol (50 parts) and refiltered, M.P. 298–299°.

EXAMPLE 7

Preparation 2-(o-hydroxyphenyl)-6-nitro-4(3H)-quinazolinone

A mixture of 5-nitroisatoic anhydride (20.8 parts) and salicylamide (13.7 parts) was heated at 160° for 2 hours to complete the gas evolution and product solidification. The solid was cooled, crushed, extracted with boiling ethanol (1000 parts), filtered and crystallized from dimethylformamide; M.P. 399–400°.

EXAMPLE 8

Preparation of 2-(2'-hydroxy-5'-chlorophenyl)-4(3H)-quinazolinone

A mixture of 4.13 parts of 5-chlorosalicylamide and 4.5 parts of isatoic anhydride in 18 parts of dimethylformamide was heated at 145° for 4 hours. The reaction product was cooled, filtered, crystallized from dimethylformamide and dried in vacuo at 56°; M.P. 365–6°.

EXAMPLE 9

Preparation of 2-(2'-nitro-4'-chlorophenyl)-4(3H)-quinazolinone 2-nitro-4-chlorobenzamide (4.0 parts) and isatoic anhydride (3.0 parts) were heated in refluxing p-cymene (10 parts) for 5 hours. The mixture was cooled to 30° C., the p-cymene was decanted, and the residue was dissolved in 80° C., 5% aq. sodium hydroxide solution. The solution was acidified with dilute hydrochloric acid and filtered to collect the precipitate. This compound, crystallized from ethanol, melted at 257–8°.

EXAMPLE 10

Preparation of 6-chloro-2-(o-hydroxyphenyl)-4(3H)-quinazolinone

A mixture of 1.98 parts of 5-chloroisatoic anhydride, 1.38 parts of salicylamide and 6 parts of dimethylformamide was heated at 145° for 3 hours, then allowed to cool to room temperature. The precipitated product was filtered off and recrystallized from dimethylformamide, M.P. 329–330°.

Besides having utility as fluorescent and UV screening agents as described in the art, the quinazolinones are useful intermediates to a variety of quinazolines, themselves widely useful as well known to the art.

The foregoing detailed description has been given for clearness of understanding only and no unnecessary limitations are to be understood therefrom. This invention is not limited to the exact details shown and described, for obvious modifications will occur to those skilled in the art.

What is claimed is:

1. A process consisting essentially of:
(A) reacting a benzamide of the formula

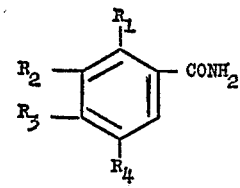

where $R_{1-4}$ are separately selected from hydrogen, alkyl containing 1 to 5 carbon atoms, alkoxy containing 1 to 5 carbon atoms, hydroxy, halo and nitro groups, with an isatoic anhydride of the formula

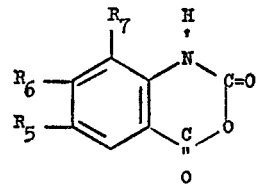

where $R_{5-7}$ are separately selected from hydrogen, alkyl containing 1 to 5 carbon atoms, alkoxy containing 1 to 5 carbon atoms, halo and nitro groups, at a temperature of from about 120° C. to about 205° C. for a time sufficient to eliminate both carbon dioxide and water from the reaction mass; and (B) recovering the resultant 2-phenyl-4(3H)-quinazolinone from the reaction mass.

2. Claim 1 wherein said benzamide is selected from benzamide, m-nitrobenzamide, p-nitrobenzamide, p-chlorobenzamide, p-methylbenzamide, 2-nitro-4-chlorobenzamide, salicylamide and 5-chlorosalicylamide; and wherein said isatoic anhydride is selected from isatoic anhydride, 5-nitroisatoic anhydride and 5-chloroisatoic anhydride.

3. Claim 1 wherein $R_{1-7}$ are hydrogen.
4. Claim 1 wherein $R_1$ is a hydroxy group.
5. Claim 4 wherein $R_{2-7}$ are hydrogen.
6. Claim 4 wherein $R_5$ is a chloro group and wherein $R_{2-4}$ and $R_{6-7}$ are hydrogen.
7. Claim 4 wherein $R_5$ is a nitro group and wherein $R_{2-4}$ and $R_{6-7}$ are hydrogen.
8. Claim 1 wherein the reaction is carried out in an organic solvent which is inert to the reactants and reaction products.

References Cited
UNITED STATES PATENTS 3,169,129  2/1965  Rodgers et al. _____ 250—251
3,526,627  9/1970  Brooks _____ 260—251

ALTON D. ROLLINS, Primary Examiner

R. V. RUSH, Assistant Examiner

U.S. Cl. X.R.

260—256.4 Q